United States Patent
Hoefler et al.

(10) Patent No.: US 8,974,154 B2
(45) Date of Patent: Mar. 10, 2015

(54) CUTTING INSERT AND SHIM FOR MILLING CUTTERS

(75) Inventors: Brian D. Hoefler, Macomb, MI (US); Yevgeny Kocherovsky, West Bloomfield, MI (US)

(73) Assignee: Sandvik Intellectual Property AB, Sandviken (SE)

(*) Notice: Subject to any disclaimer, the term of this patent is extended or adjusted under 35 U.S.C. 154(b) by 1034 days.

(21) Appl. No.: 13/045,637

(22) Filed: Mar. 11, 2011

(65) Prior Publication Data
US 2012/0230784 A1    Sep. 13, 2012

(51) Int. Cl.
| B23C 5/10 | (2006.01) |
| B23C 5/22 | (2006.01) |
| B23C 5/20 | (2006.01) |
| B23B 27/16 | (2006.01) |

(52) U.S. Cl.
CPC .............. *B23C 5/2247* (2013.01); *B23C 5/109* (2013.01); *B23C 5/207* (2013.01); *B23C 2200/0455* (2013.01); *B23C 2200/0494* (2013.01); *B23C 2200/165* (2013.01); *B23C 2210/166* (2013.01); *B23C 2210/168* (2013.01); *B23C 2260/80* (2013.01)
USPC ............................................ 407/46; 407/101

(58) Field of Classification Search
USPC ...................... 407/46, 80, 101, 102
See application file for complete search history.

(56) References Cited

U.S. PATENT DOCUMENTS

| 2,085,095 A | 6/1937 | Grattan |
| 4,708,537 A | 11/1987 | Elka et al. |
| 5,129,767 A | 7/1992 | Satran et al. |
| 5,551,811 A | 9/1996 | Satran et al. |
| 5,836,724 A * | 11/1998 | Satran et al. .................. 407/104 |
| 5,871,309 A | 2/1999 | Svensson |
| 5,888,029 A * | 3/1999 | Boianjiu ......................... 407/66 |
| 5,913,644 A | 6/1999 | DeRoche et al. |
| 6,004,080 A * | 12/1999 | Qvarth et al. .................. 407/36 |
| 6,146,060 A * | 11/2000 | Rydberg et al. ................ 407/40 |

(Continued)

FOREIGN PATENT DOCUMENTS

| EP | 1 647 346 A1 | 4/2006 |
| WO | WO 99/19105 | 4/1999 |

(Continued)

OTHER PUBLICATIONS

International Search Report for PCT/SE2012/050238, dated Jun. 14, 2012.

(Continued)

*Primary Examiner* — Will Fridie, Jr.
(74) *Attorney, Agent, or Firm* — Morgan, Lewis & Bockius LLP

(57) ABSTRACT

A cutting tool includes a polygonal cutter body and an end cutting insert for chipforming machining mounted in a serrated seat disposed at an axial end of the cutter body. A bottom surface of the insert has a plurality of parallel serrations meshing with corresponding serrations of the seat. The serrations extend transversely relative to the longitudinal axis for resisting axially rearward cutting forces applied to the insert. The seat is formed directly by the cutter body, or by a shim disposed beneath the insert. The shim is provided with a downward lip to transfer axial forces to the cutter body. The insert can be square or triangular, wherein the serrations are in the form of a plurality of sets of parallel serrations disposed adjacent respective cutting edges.

25 Claims, 6 Drawing Sheets

(56) References Cited

U.S. PATENT DOCUMENTS

| | | | |
|---|---|---|---|
| 6,146,061 A * | 11/2000 | Larsson | 407/103 |
| 6,293,737 B1 | 9/2001 | Satran et al. | |
| 6,503,028 B1 | 1/2003 | Wallström | |
| 6,921,234 B2 * | 7/2005 | Arvidsson et al. | 407/103 |
| 7,549,358 B2 * | 6/2009 | Pantzar | 82/1.11 |
| 7,578,641 B2 * | 8/2009 | Andersson et al. | 407/113 |
| 7,585,137 B2 * | 9/2009 | Pantzar | 407/66 |
| 7,597,510 B2 * | 10/2009 | Lundvall | 407/113 |
| 7,607,867 B2 | 10/2009 | Benson | |
| 7,780,381 B2 * | 8/2010 | Sjoo et al. | 407/113 |
| 7,819,610 B2 | 10/2010 | Wallström et al. | |
| 8,042,437 B2 * | 10/2011 | Maier et al. | 82/161 |
| 8,475,087 B2 * | 7/2013 | Wihlborg et al. | 407/46 |
| 2005/0158132 A1 * | 7/2005 | Pantzar | 407/48 |
| 2005/0244233 A1 * | 11/2005 | Jonsson | 407/116 |
| 2008/0145159 A1 * | 6/2008 | Benson | 407/114 |
| 2008/0181731 A1 | 7/2008 | Wallstrom et al. | |
| 2009/0196701 A1 | 8/2009 | Wihlborg et al. | |

FOREIGN PATENT DOCUMENTS

| | | | | |
|---|---|---|---|---|
| WO | WO 00/37204 | 6/2000 | | |
| WO | WO 02/055243 A1 | 7/2002 | | |
| WO | WO 2004/098818 A2 | 11/2004 | | |
| WO | WO 2004098818 A2 * | 11/2004 | | B22F 7/06 |
| WO | WO 2005/080036 A1 | 9/2005 | | |

OTHER PUBLICATIONS

Written Opinion of the International Search Report for PCT/SE2012/050238, dated Jun. 14, 2012.

* cited by examiner

CUTTING INSERT AND SHIM FOR MILLING CUTTERS

TECHNICAL FIELD AND INDUSTRIAL APPLICABILITY

The present disclosure relates to methods and apparatus for performing chipforming machining, wherein metal-cutting inserts mounted in the cutter body are subjected to considerable forces in an axial or longitudinal direction of the cutter body.

BACKGROUND

In the discussion of the background that follows, reference is made to certain structures and/or methods. However, the following references should not be construed as an admission that these structures and/or methods constitute prior art. Applicants expressly reserve the right to demonstrate that such structures and/or methods do not qualify as prior art.

Cutting tools for the chipforming machining of metallic workpieces typically employ a cutter body on which are mounted cutting inserts of thin, polygonal shape, such as rectangular (square or non-square) and triangular. Such inserts have top and bottom surfaces interconnected by a side surface that intersects the top surface to form cutting edges therewith.

For example, in a long edge milling cutter, the cutting inserts are arranged in respective insert seats on a cutter body such that one of the cutting edges of each insert is positioned to constitute an active cutting edge and is oriented generally in the fore-aft direction, i.e., generally radially relative to the longitudinal axis of the cutter body. Those cutting edges are generally aligned to form helical cutting flutes which cut a workpiece when relative rotation between the cutter body and the workpiece occurs about the longitudinal axis of the cutter body. In addition, each of the frontmost, or end, inserts on the cutter body has an active front cutting edge oriented transversely relative to the longitudinal axis. During a cutting operation, all of the cutting inserts are subjected to forces in the radial inward direction of the cutter body which can be resisted by mounting inserts such that they bear against a radially outwardly facing surface of the cutter body. In addition, the end inserts are further subjected to substantial forces in the axially rearward direction of the cutter body, due to the presence of their active transverse cutting edges.

The axially rearward forces applied to the end inserts may not be completely resisted by the mounting screw, but can be further resisted by abutting the inserts against axially forwardly facing support walls of the cutter body. However, that increases the amount of material for fabricating the cutter body, and may interfere with chip formation on adjacently located inserts. Also, by configuring such support walls to conform to the shape of the abutting face of the abutting insert, it may occur that the cutter body is prevented from accommodating a wide variety of shapes.

It has also been proposed to resist the axial force acting on an end insert by providing the bottom surface of the insert with a recess, e.g., of generally pyramidal shape, which seats on a correspondingly shaped upward protrusion of the insert seat (e.g., see U.S. Pat. No. 7,819,610). However, such an arrangement has met with only limited success.

In the case of high-speed cutters which cut relatively light-weight materials such as aluminum, the inserts are subjected to high centrifugal forces. It has been proposed to resist such centrifugal forces by providing the bottom surface of the cutting insert with serrations oriented parallel to the longitudinal axis of the cutter body, which serrations mesh with corresponding serrations formed in the insert seat (e.g., see U.S. Pat. No. 6,921,234). However, such serrations would not effectively resist the axial forces applied to the end inserts of a lower-speed cutter which cuts heavier-weight materials.

In U.S. Pat. Nos. 6,146,060 and 7,585,137, it has been proposed to provide the bottom surface of a cutting insert with two sets of serrations, with the serrations of each set oriented parallel to one another and perpendicular to the serrations of the other set. Those opposing sets of serrations mesh with corresponding serrations formed in the seat and thus offer resistance to cutting forces applied in different directions, e.g., axial and radial directions. Although being effective, inserts of that type are relatively difficult and expensive to manufacture. Also the total force-resisting surface area defined by each set of serrations is reduced, due to the presence of the other set of serrations. In addition, it will be appreciated that once the insert is mounted, it is locked against movement in any direction, eliminating the ability of pressing the insert against a surface of the cutter body, e.g., by a mounting screw, for maximizing the insert's stability.

The insert seats can be formed directly on the cutter body, or by means of a separate shim interposed between the insert and the cutter body. Such a shim offers a certain degree of protection for the cutter body in the event of a catastrophic failure of the cutting insert during a cutting operation.

It is apparent from the foregoing discussion that it would be desirable to provide cutting inserts with better support against axially rearwardly directed forces.

BRIEF SUMMARY OF THE DISCLOSURE

Disclosed herein is a cutting insert for chipforming machining, comprising a polygonally shaped body including top and bottom surfaces interconnected by a pair of long side faces and a pair of short side faces, the side faces intersecting the top surface to form therewith a pair of main cutting edges and a pair of secondary cutting edges. Each secondary cutting edge is shorter than the main cutting edges and intersects both main cutting edges. The top surface is shaped substantially symmetrically about an imaginary bisector extending through both secondary cutting edges. The bottom surface has formed therein a plurality of serrations formed therein. All serrations in the bottom surface are oriented parallel to one another and extend transversely relative to the bisector.

Also disclosed is a shim for defining a seat for a cutting insert. The shim comprises first and second portions, the first portion having substantially parallel upper and lower surfaces and defining front and rear ends spaced apart along a fore-aft direction of the shim. The upper surface includes a plurality of serrations. All serrations formed in the upper surface are parallel to one another and extend transversely relative to the fore-aft direction. The second portion is disposed at least at the front end of the first portion and forms a lip projecting downwardly past the lower surface. In lieu of a lip, the lower surface of the first portion can be provided with parallel serrations.

Further disclosed is a cutting tool comprising a cutter body which defines a longitudinal axis, and at least one indexable end cutting insert for chip forming machining mounted in a serrated seat disposed at an axial end of the cutter body. The cutting insert includes top and bottom surfaces interconnected by a plurality of side faces intersecting the top surface to form therewith a plurality of cutting edges, one of which being positioned to constitute an active cutting edge oriented generally parallel to the longitudinal axis. The bottom surface includes a plurality of parallel serrations disposed in meshing engagement with corresponding serrations of the serrated seat. All serrations of the insert and all serrations of the seat are oriented parallel to one another and extend transversely relative to both the active cutting edge and the longitudinal axis for resisting axially rearward forces applied to the insert during a cutting operation, with the insert being pressed against a transversely facing surface of the cutter body (e.g., by a mounting screw).

Further disclosed is a cutting insert for chipforming machining, comprising a polygonally shaped body including top and bottom surfaces and at least three side faces interconnecting the top surface to form corresponding cutting edges therewith. The bottom surface has formed therein a plurality of sets of serrations disposed adjacent respective cutting edges. All serrations of each set are parallel to one another and extend transversely relative to the respective cutting edge. At least some of the serrations of each set are closed at one end. The serrations of each set are oriented non-parallel to the serrations of at least two other sets.

Also disclosed is a cutting tool comprising a cutter body defining a longitudinal axis, and at least one indexable end cutting insert for chipforming machining mounted in a serrated seat disposed at an axial end of the cutter body. The cutting insert comprises a polygonally shaped body including top and bottom surfaces and at least three side faces interconnecting the top surface to form corresponding cutting edges therewith. The bottom surface has formed therein a plurality of sets of serrations disposed adjacent respective cutting edges. All serrations of each set are oriented parallel to one another and extend transversely relative to the respective cutting edge. The serrations of each set are oriented non-parallel to the serrations of at least two other sets. The serrated seat includes serrations extending in only one direction transversely relative to the cutting edge and meshing only with serrations of the insert that extend in such transverse direction, to enable the cutting insert to be pressed against a transversely facing surface of the cutter body (e.g., by a mounting screw).

Also disclosed is a cutter body defining a longitudinal axis and forming seats adapted to mount cutting inserts. The seats include end seats disposed at a front longitudinal end of the cutter body, which end seats include a plurality of serrations. All serrations formed in the cutter body are oriented parallel to one another and extend transversely relative to the longitudinal axis.

BRIEF DESCRIPTION OF THE DRAWINGS

The following detailed description can be read in connection with the accompanying drawings in which like numerals designate like elements.

DETAILED DESCRIPTION OF PREFERRED EMBODIMENTS

As described hereafter, cutting inserts mounted in respective seats disposed at a front axial end of a cutter body, such as a cutter body for a milling cutter for example, include serrations which mesh with corresponding serrations of the seats. The serrations are oriented for resisting axially rearward forces applied to the inserts during a milling operation. That is, the serrations are oriented transversely relative to the longitudinal axis of the cutter body.

Figure 1:
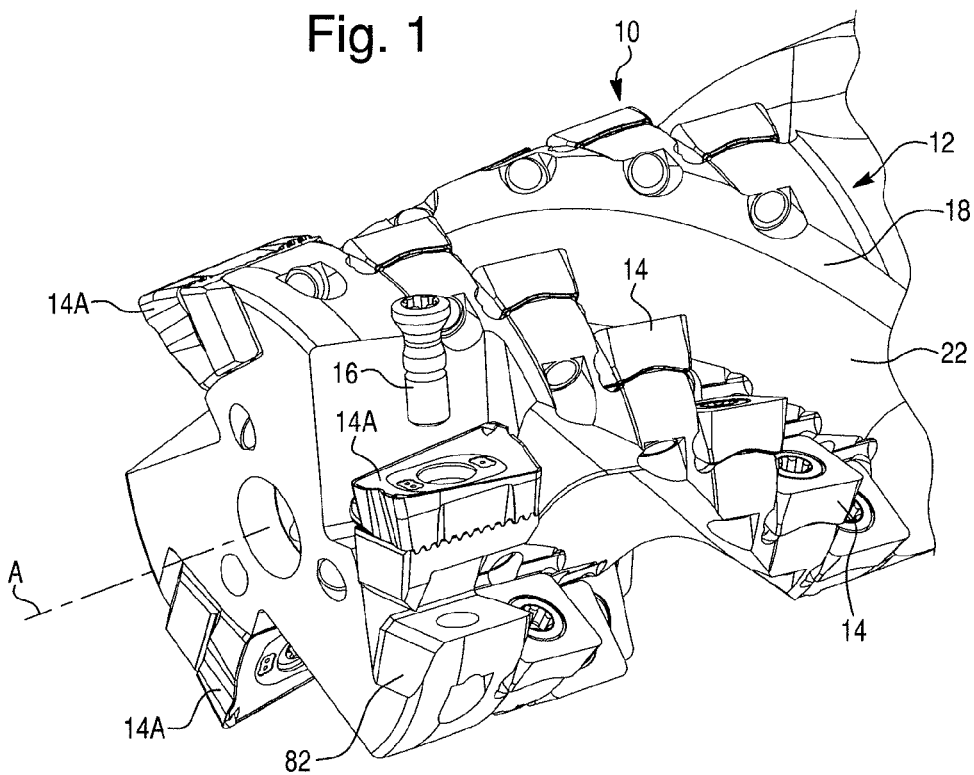
FIG. 1 is a front perspective view of a long edge milling cutter, with one of the front cutting inserts shown in the process of being installed along with a shim that forms a seat for the insert.
Figure 2:
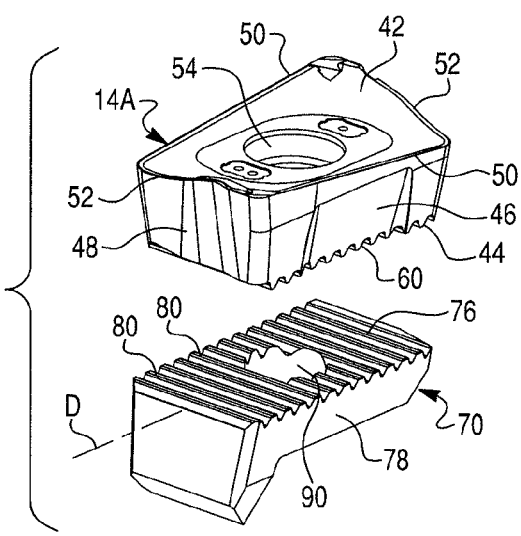
FIG. 2 is an exploded perspective view of the cutting insert and the shim of FIG. 1.

Depicted in FIG. 1. is a long edge milling tool 10 comprised of a cutter body 12 on which are disposed seats in which respective cutting inserts 14 are secured by means of mounted screws 16. Those screws traverse through-holes formed in the inserts and are threadedly secured in threaded holes formed in the cutter body. The inserts 14 are arranged to form a plurality of cutting flutes 18 arranged helically about a longitudinal axis A of the cutter body. Helical channels 22 are disposed adjacent the flutes 18 for conducting away chips that are separated from a workpiece (not shown) during a cutting operation.

The inserts 14 include front inserts, or end inserts, 14A situated at a front axial end of the cutter body. As explained earlier herein, all of the inserts in a milling cutter are subjected to radially inward cutting forces during a milling operation, due to the presence of active axial cutting edges oriented generally parallel to the longitudinal axis of the cutter body. However, the front inserts 14A are also subjected to strong axially rearward cutting forces due to the presence of their active transverse cutting edges. The present disclosure explains how to resist those axial forces imposed on the front inserts in an effective and economical way by providing specially oriented serrations on the front inserts and their respective seats.

Each front insert 14A comprises a body of generally non-square rectangular shape, although the inserts can have other shapes, such as square and triangular, as will be later explained. The insert 14 also includes top and bottom surfaces 42, 44 interconnected by a side surface which comprises a plurality of long and short side faces 46, 48. The long side faces intersect the top surface to form two main cutting edges 50, and the short side faces intersect the top surface to form two secondary cutting edges 52. The secondary cutting edges 52 are shorter than the main cutting edges, and each secondary cutting edge intersects both of the main cutting edges at respective corners of the insert. A through-hole 54 extends through a geometric center of the insert for receiving the securing screw 16.

Figure 3:
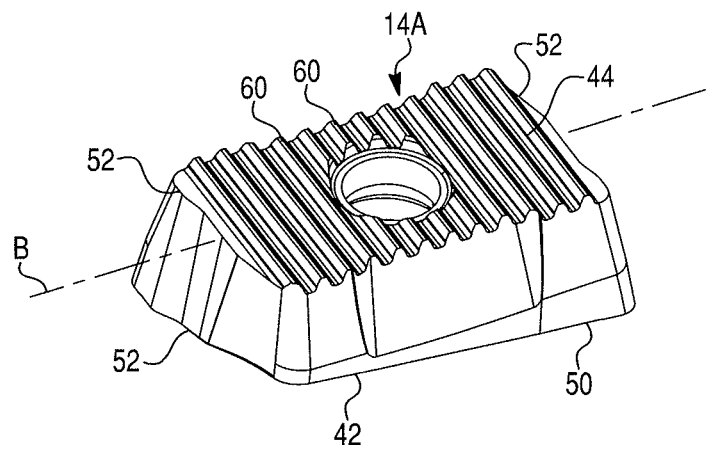
FIG. 3 is a bottom perspective view of the cutting insert of FIG. 1.

An imaginary longitudinal bisector B of the insert (FIG. 3) extends through the secondary cutting edges 52 and through the center of the through-hole 54 and bisects the insert in the long direction thereof. Thus, the secondary cutting edges 52 extend transversely relative to the bisector B, and the main cutting edges 50 extend generally parallel to the bisector. The insert is indexable in that it can be rotated 180 degrees to locate either of the pairs of main and secondary cutting edges in cutting position.

Figure 8:
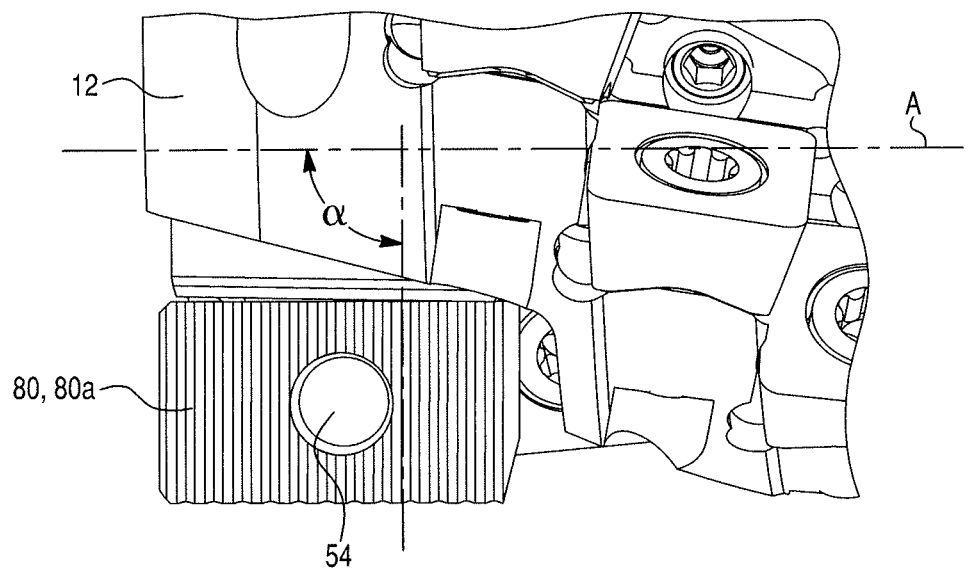
FIG. 8 is a schematic view of a cutter body showing a first relationship between the seat serrations and a longitudinal axis of the cutter body.
Figure 9:
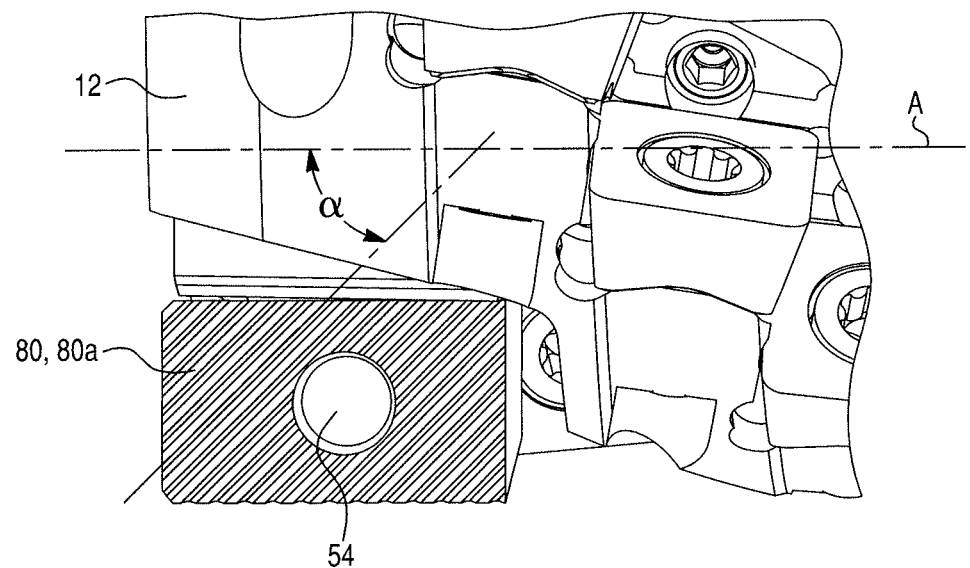
FIG. 9 is a schematic view of a cutter body showing a second relationship between the seat serrations and the longitudinal axis of the cutter body.

The top surface 42 of each front insert 14A is shaped substantially symmetrically about the imaginary bisector B. The bottom surface 44 includes parallel alternating recesses and projections which define a plurality of serrations 60 extending transversely relative to the bisector B and which mesh with serrations 80 or 80A of the seat, as will be explained. Preferably, the entire area of the surface 44 is serrated in order to maximize the force-resisting area. The serrations 60 form an angle α with the bisector B and thus also form the angle α with the axis A. For example, the angle α could be substantially 90 degrees as shown in FIG. 8, to provide maximum resistance to axially rearward cutting forces. However, as shown in FIG. 9, the angle α could be an acute angle, as small as about 30 degrees. In the event of an acute angle, the inclination of the serrations is preferably such that the radially outer end of each serration is disposed farther forwardly than the serration's radially inner end, as shown in FIG. 9. Thus, the axially rearward cutting forces acting on the insert will have a radially inward component tending to press the cutting insert radially inwardly against the cutter body to more effectively resist oscillation of the insert during a cutting operation.

The serrations 60 are spaced apart along the bisector B such that one or more of the serrations are disposed on each side of the through-hole 54, when considered in the direction of the bisector B. There can be any number of serrations on each side of the through-hole, and there can be more serrations on one side than on the other side.

The serrations 60 can have any suitable configuration, such as any of the configurations described in U.S. Pat. No. 6,921,234, the disclosure of which is incorporated herein by reference.

As noted above, the inserts 14A are mounted in seats disposed on the cutter body. Seats 80 can be formed directly in the cutter body 12, as shown in FIG. 7, or seats 80A can be formed by shims 70 that are disposed between the cutter body and the insert, as shown in FIGS. 1, 2 and 4-6.

Described initially is the case where the seats are defined by shims 70. The shims are preferably arranged between the cutter body 12 and the front inserts 14A, because the portions of the cutter body disposed beneath those front inserts are particularly susceptible to damage in the event of a catastrophic insert failure. Alternatively, however, shims could also be provided for the other inserts.

Figure 4:
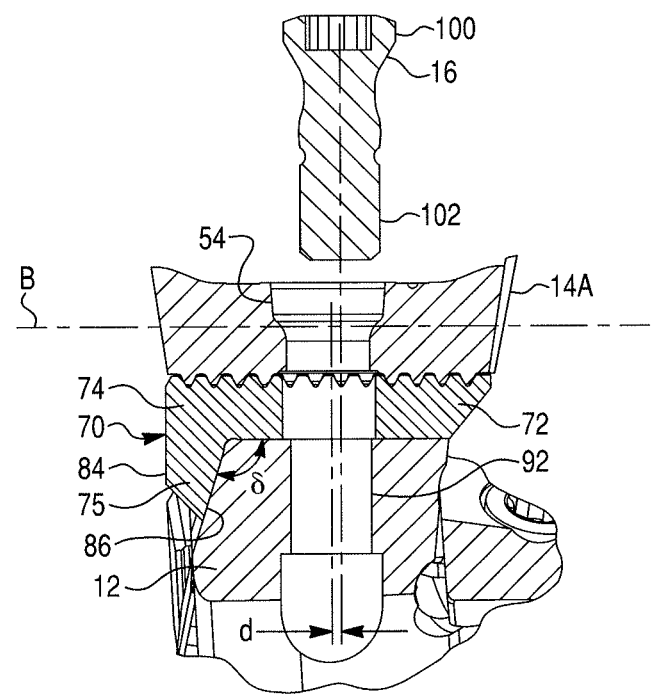
FIG. 4 is a side elevational view of the cutting insert mounted on a first shim embodiment.

Each shim defines a fore-aft direction D (FIG. 2) and comprises first and second portions 72, 74. The direction D is oriented substantially parallel to the axis A of the cutter body. The first portion 72 has substantially parallel upper and lower surfaces 76, 78. The lower surface 78 is smooth, and the upper surface 76 has formed therein a plurality of serrations 80 extending transversely relative to the fore-aft direction D. i.e., at an angle corresponding to the angle α of the insert's serrations. The second portion 74 is disposed at a front end of the first portion and forms a downwardly projecting lip 75 extending past the lower surface 78. That lip overlies and engages a section 82 of the cutter body (FIG. 1) to precisely position the shim in the axial direction of the cutter body and to resist axially rearwardly directed forces transmitted thereto by the cutting insert. Also, the lip may afford a certain degree of additional protection to the underlying section of the cutter body in the event of a catastrophic failure of the cutting insert. The lip 74 includes front and rear faces 84, 86 which extend from front ends of the upper and lower surfaces 76, 78, respectively. The rear face 86 preferably extends downwardly and is inclined forwardly, i.e., away from the lower surface 78, at an obtuse angle δ, as shown in FIG. 4, to engage the correspondingly angled section 82 of the cutter body.

Figure 5:
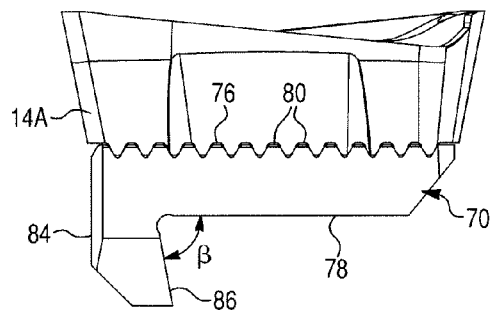
FIG. 5 is a side elevational view of the cutting insert mounted on a second shim embodiment.
Figure 6:
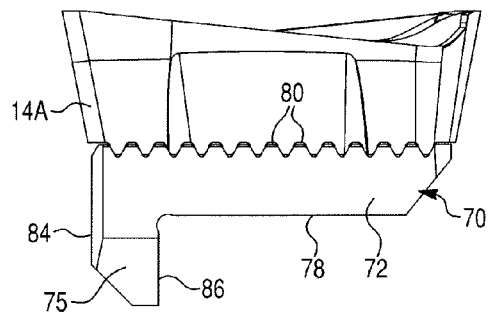
FIG. 6 is a side elevational view of the cutting insert mounted on a third shim embodiment.
Figure 7:
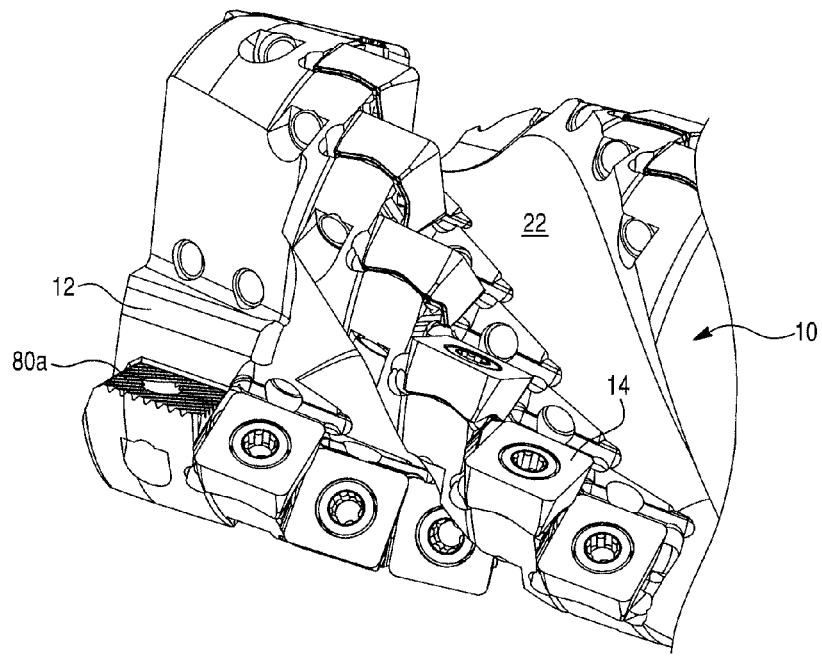
FIG. 7 is a side elevational view of a long edge milling cutter, showing a serrated seat formed directly on the cutter body.

Alternatively, the rear face 86 could be oriented perpendicularly to the lower surface 78 as shown in FIG. 6, or it could be inclined rearwardly, i.e., toward the rear end of the shim to form an acute angle β. with the lower surface 78 as shown in FIG. 5.

Extending through the shim from the upper surface 76 to the lower surface 78 is a through-hole 90 (FIG. 2) which is adapted to receive the securing screw 16. The shim's serrations 80 are configured to mesh with the insert's serrations 60. Thus, the serrations 80 could be oriented perpendicularly to the fore-aft direction D (and thus perpendicularly to the axis A), or at a 45-degree angle relative to the direction D (and thus at a 45-degree angle with the axis A), depending on the orientation of the serrations 60.

As in the case of the serrations 60, some of the serrations 80 are disposed on one side of the through-hole 90, and others are disposed on the opposite side of the through-hole 90, as considered in the direction of the direction D.

During a milling operation, the axially rearward forces applied to the end cutting inserts are transmitted to the shim via the serrations 60, 80, and those forces are, in turn, transmitted to the cutter body by the lip 75, to be resisted by the cutter body.

In lieu of the lip 75, the shim could be mounted in a pocket of the cutter tool in engagement with a wall of the pocket to resist axially rearwardly directed cutting forces that are transmitted thereto.

In the case where no shims are provided, i.e., where the insert seat is formed directly in the cutter body, serrations 80a would be formed directly in the cutter body, as shown in FIG. 7. As in the case of the serrations 60, 80, 81, such serrations 81 would form an angle in the range 30-90 degrees relative to the longitudinal axis A. The relationship of the serrations 81 with the hole 92 would be the same as the relationship of the serrations 80 with the through-hole 90 described earlier.

As explained above, each of the front inserts 14A has a through-hole 54 which receives the securing screw 16. That screw 16 has a head 100 (see FIG. 4.) that bears against the side of the insert hole 54. The screw 16 also has a screw-threaded end 102 which is threadedly received in a threaded hole 92 of the cutter body. Once the insert has been mounted in the seat (regardless of whether the seat is formed by a shim or directly in the cutter body), such that the insert serrations 60 and the seat serrations 80 (or 80a) are meshed, and the insert has been pushed radially into abutment with the cutter body, it is preferred that the center of the threaded hole 92 is not perfectly aligned with the center of the through-hole 54. Rather, as shown in FIG. 4, those centers are slightly radially offset by a distance d. The offset is made in such a direction that when the securing screw is installed, the head 100 of the securing screw will become elastically bent slightly in a direction having an axially forward component and a radially outward component. As a result, as the screw tends to rebound radially inwardly and axially rearwardly to its unbent shape, it will create a prestress on the insert, pressing the insert generally axially rearwardly and generally radially inwardly against a transversely facing surface 93 of the cutter body (see FIGS. 1 and 7) in order to enhance the stability of the insert against oscillation.

It should be understood that the extent of bending of the screw 16 (and thus the strength of the prestress) will be greater when a shim is employed, because then a longer screw 16 can be utilized as compared to the non-shim embodiment.

It will be appreciated from the foregoing description that when the front inserts 14A are installed on the cutter body 12, the meshing engagement between the insert serrations 60 and the seat serrations 80 (or 80a) will enable the insert to effectively resist the relatively strong axially rearward forces applied to the front inserts 14A during a milling operation. In the event that a shim is employed, engagement of the lips 75 with the tool body, enable the axially rearward cutting forces to be transferred from the shim to the cutter body.

Figure 10:
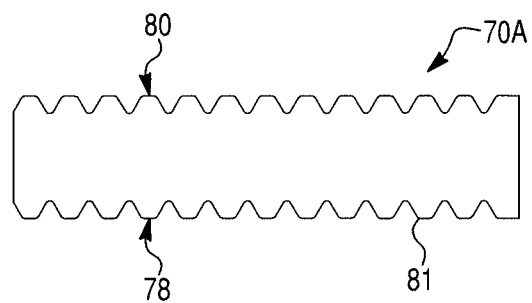
FIG. 10 is a bottom plan view of a square cutting insert having a plurality of sets of serrations formed in its bottom surface.

As pointed out earlier, the cutting inserts can assume a variety of shapes. Depicted in FIG. 10 is a square cutting insert 200 which has four cutting edges 202a-d and thus can be indexed between four cutting positions, wherein one of the cutting edges constitutes an active cutting edge oriented generally parallel to the longitudinal axis of the cutter body. Disposed on its bottom surface, the insert 200 has four sets of parallel serrations 204a-d associated with respective cutting edges 202a-d. The serrations of each set extend non-parallel to the serrations of two others of the sets and are oriented transversely relative to the respective cutting edge so as to resist axial cutting forces applied to thereto. The serrations of each set are of graduated length, wherein the longer serrations are located adjacent the insert's through-hole 206, and the shortest serrations are disposed at respective ends of the cutting edge. Each of the serrations is closed at one end thereof, although the centrally located serrations of each set which extend toward the hole 206 could intersect the hole and thus be open at both ends.

Figure 11:
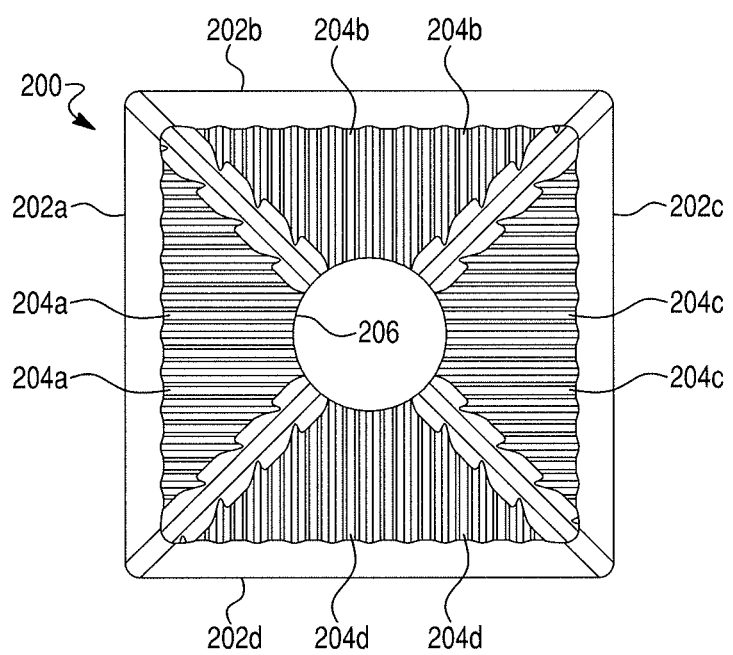
FIG. 11 is a fragmentary plan view of a seat formed in a cuter body for receiving the square insert shown in FIG. 10.

An insert seat for the insert 200 would be configured to enable axial cutting forces to be resisted, while enabling the insert to be pressed against a transversely facing surface of the cutter body. An example of such a seat 205, shown in FIG. 11, can be formed by a shim or by the cutter body itself. The seat 205 is provided with two parallel sets of serrations 205a and 205b oriented transversely relative to the axis A of the cutter body and would thus mesh either with the insert's serrations 204a and 204c (which extend in the same direction E), or with the insert's serrations 204b and 204d (which extend in the same direction F), depending on which of the cutting edges constitutes the active cutting edge. The two non-meshing sets of the insert's serrations would be received in non-serrated areas 206 of the seat, e.g., recessed areas, and thus would be deactivated, i.e., incapable of obstructing movement of the insert toward the cutter body. Accordingly, the insert could be pressed against a transversely facing surface of the cutter body by a mounting screw, as discussed earlier.

In lieu of being oriented perpendicularly to the cutting edges, the sets of serrations 204a-d could be oriented at an acute angle of no less than about 30 degrees to their respective cutting edges, as explained earlier. In that event, the seat would possess only one set of serrations which would be arranged to mesh with the serrations associated with the active cutting edge. The seat would also include two non-serrated areas for receiving, and deactivating, the other two sets of serrations of the insert. Thus the ability of the insert to be pressed against the cutter body by a mounting screw would be ensured.

Figure 12:
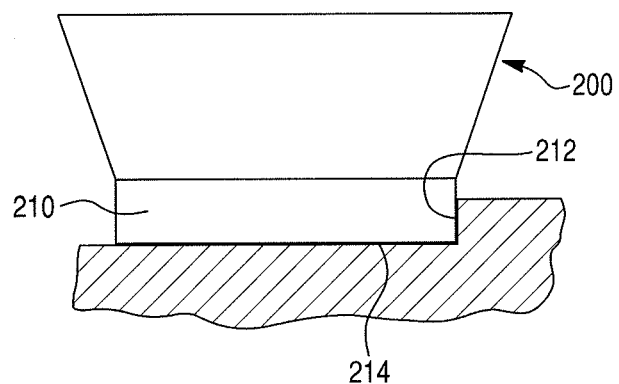
FIG. 12 is a side elevational view showing the square insert of FIG. 10 mounted on a shim disposed in a pocket of a cutter body.

In the event the seat for the square insert 200 is formed by a shim 210, the shim could be configured to transmit axially rearwardly directed cutting forces to the cutter body in any suitable manner, such as by a lip 75 described earlier, or by engaging a wall 212 of a pocket 214, as shown in FIG. 12.

Figure 13:
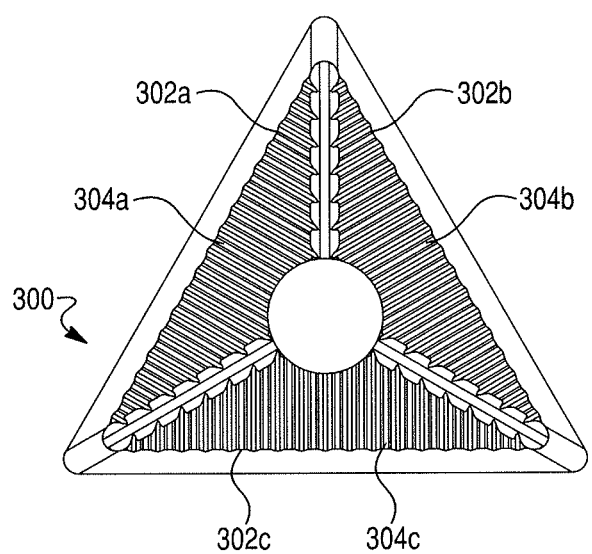
FIG. 13 is a bottom plan view of a triangular cutting insert having a plurality of sets of parallel serrations formed in its bottom surface.

Another possible shape for the cutting inserts is triangular, as shown in FIG. 13. In that case, the triangular insert 300 would have three cutting edges 302a-c and would be indexable between three cutting positions. Three sets of serrations 304a-c would be provided for the respective cutting edges. The serrations of each set would be oriented non-parallel to the serrations of the other sets. The corresponding seat on the cutter body would have only one set of serrations for meshing only with one set of serrations of the insert, i.e., the serrations associated with the active cutting edge. The seat would also include two large recesses for receiving the other serrations.

Although the milling tool examples disclosed herein are for long edge milling operations, it will be understood that the expedients disclosed herein are useful for other milling operations such as face milling and end milling. Moreover, those expedients are also useful in types of chipforming machining, other than milling, in which considerable axial forces are to be resisted, such as turning and boring operations.

Although preferred embodiments have been described herein, it will be appreciated to those of ordinary skill in the art that additions, deletions, modifications and substitutions not specifically described may be made without departing from the scope of the appended claims.

What is claimed is:

1. A cutting insert for chipforming machining, comprising a polygonally shaped body including top and bottom surfaces interconnected by a pair of long side faces and a pair of short side faces; the long side faces intersecting the top surface to form therewith a pair of main cutting edges; the short side faces intersecting the top surface to form therewith a pair of secondary cutting edges; the secondary cutting edges being shorter than the main cutting edges and intersecting both main cutting edges; the top surface shaped substantially symmetrically about an imaginary bisector of the insert which extends through both secondary cutting edges; the bottom surface having formed therein a plurality of serrations; wherein all serrations formed in the bottom surface being oriented parallel to one another and extending transversely relative to the bisector.

2. The indexable cutting insert according to claim 1, wherein each of the serrations forms an angle with the bisector in the range of about 30 degrees to about 90 degrees.

3. The indexable cutting insert according to claim 1, wherein the angle is substantially 90 degrees.

4. The indexable cutting insert according to claim 1, wherein a through-hole extends through a geometrical center of the insert from the top surface to the bottom surface, there being at least two said serrations spaced apart along the bisector and situated on opposite respective sides of the through-hole.

5. The indexable cutting insert according to claim 1, wherein the serrations are formed in substantially the entire area of the top surface.

6. A shim defining a seat for a cutting insert, the shim comprising first and second portions, the first portion having substantially parallel upper and lower surfaces and defining front and rear ends spaced apart along a fore-aft direction of the shim; the upper surface including a plurality of serrations, wherein all serrations formed in the upper surface being oriented parallel to one another and extending transversely relative to the fore-aft direction, the second portion disposed at the front end of the first portion and forming a lip projecting downwardly past the lower surface.

7. The shim according to claim 6, wherein the first portion includes a through-hole extending through the upper and lower surfaces.

8. The shim according to claim 6, wherein the lip includes front and rear faces extending from the upper and lower surfaces, respectively, the rear face oriented substantially perpendicularly to the upper surface.

9. The shim according to claim 6, wherein the lip includes front and rear faces extending from the upper and lower surfaces, respectively, the rear face forming an oblique angle with the lower surface.

10. The shim according to claim 6, wherein the lip includes front and rear faces extending from the upper and lower surfaces, respectively, the rear face forming an acute angle with the lower surface.

11. The shim according to claim 6, wherein the serrations form an angle in the range of about 30 degrees to about 90 degrees with the fore-aft direction of the shim.

12. A cutting tool comprising a cutter body defining a longitudinal axis, and at least one indexable end cutting insert for chipforming machining mounted in a serrated seat disposed at an axial end of the cutter body; the cutting insert including top and bottom surfaces interconnected by a plurality of side faces which intersect the top surface to form therewith a plurality of cutting edges, one of which being arranged to constitute an active cutting edge arranged generally parallel to the longitudinal axis; the bottom surface including a plurality of parallel serrations disposed in meshing engagement with corresponding serrations of the serrated seat; wherein all serrations formed in the bottom surface of the insert and in the serrated seat being oriented parallel to one another and extending transversely relative to both the active cutting edge and the longitudinal axis for resisting axial rearward forces applied to the insert during a cutting operation, with the insert being pressed against a transversely facing surface of the cutter body, and wherein the intersection of the side faces with the top surface form first and second pairs of main and secondary cutting edges; the secondary cutting edges being shorter than the main cutting edges, and each secondary cutting edge intersecting both main cutting edges; the top surface shaped substantially symmetrically about an imaginary bisector extending through both secondary cutting edges; the serrations of the insert and the seat extending transversely relative to the bisector.

13. The cutting tool according to claim 12, wherein the serrations form an angle with the longitudinal axis in the range of about 30 degrees to about 90 degrees.

14. The cutting tool according to claim 13, wherein the angle is substantially 90 degrees.

15. The cutting tool according to claim 12, wherein the angle is an acute angle, with an axially outer end of each serration disposed forwardly of the radially inner end thereof.

16. The cutting tool according to claim 12, further including a mounting screw extending through a through-hole of the insert and threadedly connected in a threaded hole of the cutter body; the cutting insert being pressed against the transversely facing surface of the cutter body by the mounting screw.

17. A cutting tool comprising a cutter body defining a longitudinal axis, and at least one indexable end cutting insert for chipforming machining mounted in a serrated seat disposed at an axial end of the cutter body; the cutting insert including top and bottom surfaces interconnected by a plurality of side faces which intersect the top surface to form therewith a plurality of cutting edges, one of which being arranged to constitute an active cutting edge arranged generally parallel to the longitudinal axis; the bottom surface including a plurality of parallel serrations disposed in meshing engagement with corresponding serrations of the serrated seat; wherein all serrations formed in the bottom surface of the insert and in the serrated seat being oriented parallel to one another and extending transversely relative to both the active cutting edge and the longitudinal axis for resisting axial rearward forces applied to the insert during a cutting operation, with the insert being pressed against a transversely facing surface of the cutter body, wherein the seat is formed by a shim mounted between the insert and the cutter body.

18. The cutting tool according to claim 17, wherein the shim includes a first portion in which the serrations of the seat are formed, and a second portion disposed at a front end of the first portion situated at the axial end of the cutter body, the second portion defining a lip extending in a direction away from the insert and engaging an underlying portion of the front end of the cutter body.

19. The cutting tool according to claim 12, wherein the serrated seat is formed directly in the cutter body.

20. A cutting tool comprising a cutter body defining a longitudinal axis, and at least one indexable end cutting insert for chipforming machining mounted in a serrated seat disposed at an axial end of the cutter body; the cutting insert including top and bottom surfaces interconnected by a plurality of side faces which intersect the top surface to form therewith a plurality of cutting edges, one of which being arranged to constitute an active cutting edge arranged generally parallel to the longitudinal axis; the bottom surface including a plurality of parallel serrations disposed in meshing engagement with corresponding serrations of the serrated seat; wherein all serrations formed in the bottom surface of the insert and in the serrated seat being oriented parallel to one another and extending transversely relative to both the active cutting edge and the longitudinal axis for resisting axial rearward forces applied to the insert during a cutting operation, with the insert being pressed against a transversely facing surface of the cutter body, further including additional cutting inserts arranged on the cutter body behind respective end inserts to form therewith a plurality of helical cutting flutes.

21. The cutting tool according to claim 12, wherein the cutting tool comprises a milling cutter.

22. A cutting tool comprising a cutter body defining a longitudinal axis, and at least one indexable end cutting insert for chipforming machining mounted in a serrated seat disposed at an axial end of the cutter body; the cutting insert comprising a polygonally shaped body including top and bottom surfaces and at least three side faces interconnecting the top surface to form corresponding cutting edges therewith; the bottom surface having formed therein a plurality of sets of serrations disposed adjacent respective cutting edges; all serrations of each set being oriented parallel to one another and extending transversely relative to the respective cutting edge; the serrations of each set being oriented non-parallel to and non-intersecting with the serrations of at least two other sets; wherein the serrated seat includes serrations extending in only one direction transversely relative to the cutting edge and meshing only with serrations of the insert that extend in such transverse direction to enable the cutting insert to be pressed against a transversely facing surface of the cutter body.

23. The cutting tool according to claim 12, wherein the seat is formed by a shim mounted between the insert and the cutter body.

24. The cutting tool according to claim 23, wherein the shim includes a first portion in which the serrations of the seat are formed, and a second portion disposed at a front end of the first portion situated at the axial end of the cutter body, the second portion defining a lip extending in a direction away from the insert and engaging an underlying portion of the front end of the cutter body.

25. The cutting tool according to claim 12, further including additional cutting inserts arranged on the cutter body behind respective end inserts to form therewith a plurality of helical cutting flutes.

\* \* \* \* \*